United States Patent Office 3,262,362
Patented July 26, 1966

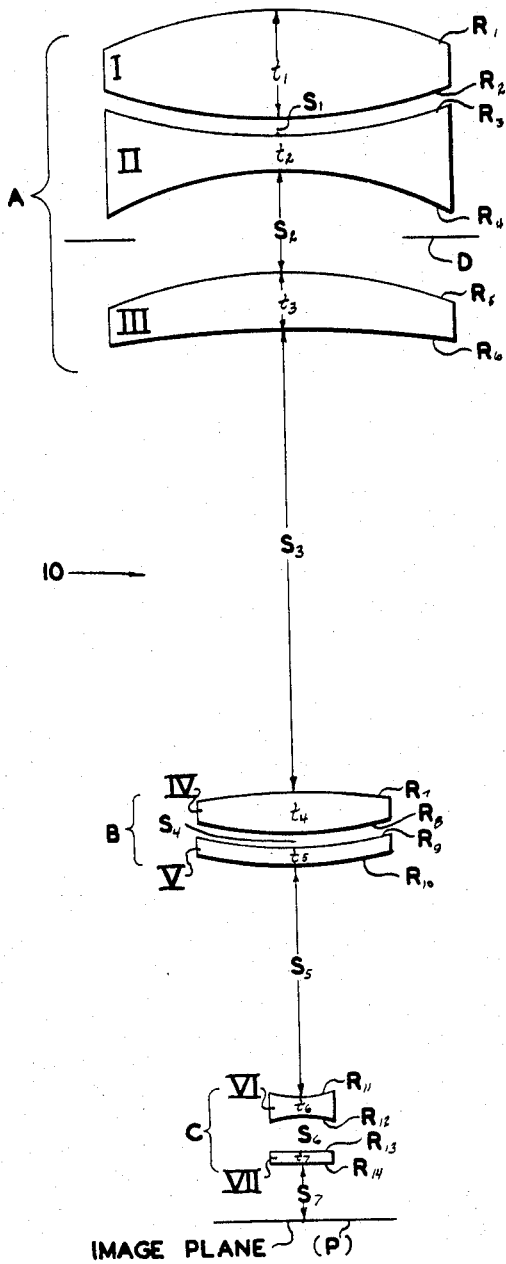

3,262,362
LONG FOCUS PHOTOGRAPHIC OBJECTIVE
Nathan Rickless, Brighton, and Paul L. Ruben, Rochester, N.Y., assignors to Bausch & Lomb Incorporated, Rochester, N.Y., a corporation of New York
Filed Mar. 1, 1963, Ser. No. 262,174
2 Claims. (Cl. 88—57)

This invention relates to a long focus photographic objective having a relative aperture of substantially $f/7.2$ and more particularly it relates to improvements in this type of an objective.

It is an object of this invention to provide such a long focus photographic objective to cover a 24 x 36 mm. format on photographic film having a relative aperture of substantially $f/7.2$, said objective being exceptionally well corrected for all spherical and chromatic image aberrations as well as astigmatism, coma, and distortion and additionally having a flat field. Further objects and advantages will be apparent in the details of construction and arrangement of parts as described in the specification hereafter taken together with the accompanying drawing, wherein the single figure illustrates one embodiment of this invention by the use of an optical diagram.

The aforesaid photographic objective is generally designated by the numeral 10 in the drawing and comprises three lens groups in optical alignment with each other. Said lens groups consist of a front group designated A located on the long conjugate side of the objective, a second lens group designated B, both of the groups A and B having positive power. Most rearwardly is provided a lens group designated C which has negative power and is used as a field flattening means. In the present invention the successive lens groups A, B and C have focal lengths which are specifically designated $F_A$, $F_B$ and $F_C$ respectively which are numerically related to each other by the following equations, $F_A$=substantially $2.01F_B$
$F_A$=substantially $3.68F_C$ The front group of lenses A is composed of a foremost double convex lens designated I, a double concave lens designated II, and a meniscus convex-concavo lens designated III, the meniscus lens being concave toward the rear and said lenses being air spaced from each other, and a diaphragm D is provided in the air space between lenses II and III.

Another characteristic of the photographic objective 10 relates to the axial air space between the group A and B which is very large and likewise the air space between groups B and C is very large, the space between group A and B being substantially twice the space between groups B and C.

Lens group B consists of a front double convex lens IV and a rearwardly spaced meniscus concave-convex lens designated V which is concave toward lens IV. The most rearwardly lens group C contains a double concave lens designated VI and most rearwardly is provided a parallel surfaced plano plate which may be clear or be formed with certain specified light filtering properties and is designated VII.

With regard to the spacing of the lenses, the space between lenses I and II is designated $S_1$, the total space between lenses II and III is designated $S_2$, the extremely long air space rearwardly of lens group A is designated $S_3$, the space between the lenses IV and V is designated $S_4$ and the space lying to the rear of group B is designated $S_5$. Rearwardly of lens VI is an air space designated $S_6$ and rearwardly of the filter plate VII is the image distance designated $S_7$.

One of the reasons for achieving the objects of this invention lies in the fact that the individual focal lengths of the lenses I to VI and filter plate VII have a numerical value and relationship to each other which is particularly effective in producing the desired results. Additionally the glasses of the successive lenses and their radii are so chosen as to reduce the secondary spectrum which is normally found in objectives of long focal lengths. Said focal lengths are designated $F_I$ to $F_{VI}$ for the individual lenses I to VI and the values of focal lengths are given in the table of mathematical expressions herebelow, wherein the minus (—) sign designates negative power, and F represents the equivalent focal length of objective 10.

$.356F<F_I<.436F$
$.283F<-F_{II}<.347F$
$.796F<F_{III}<.972F$
$.485F<F_{IV}<.593F$
$1.228F<-F_V<1.502F$
$.444F<-F_{VI}<.542F$

The aforesaid successive air spaces $S_1$ to $S_7$ have numerical values which are specified in the table of mathematical expressions herebelow, $.001816F<S_1<.002220F$
$.0158F<S_2<.0192F$
$.697F<S_3<.851F$
$.001195F<S_4<.001461F$
$.355F<S_5<.433F$ $$S_6+S_7+\frac{t_7}{n_7}$$

must be maintained constant at a value which is stated mathematically in the expression herebelow wherein $t_7$ represents the thickness of plate VII and $n_7$ represents the refractive index of the glass from which it is made.

$$.071F<S_6+\frac{t_7}{n_7}+S_7<.076F$$

In any form of the present invention the numerical values of the focal lengths $F_A$, $F_B$ and $F_C$ should lie within the specification stated in the table herebelow.

$1.724F<F_A<1.9057F$
$.856F<F_B<.947F$
$.468F<-F_C<.518F$

Furthermore, the specification for the thicknesses $t_1$ to $t_7$ which are related to the lenses I to VI and plate VII respectively should lie within the specifications stated in the table of mathematical expressions given herebelow, $.0173F<t_1<.0211F$
$.00575F<t_2<.00703F$
$.00975F<t_3<.01191F$
$.00708F<t_4<.00866F$
$.00443F<t_5<.00541F$
$.00443F<t_6<.00541F$ In connection with the foregoing specifications of focal length, air spaces and lens thicknesses, it is further specified that the materials from which the lens parts and plate are made have individual refractive index values $n_D$ and Abbe numbers $\nu$ as stated in the chart of values given herebelow,

| Optical Member | $n_D$ | $\nu$ |
|---|---|---|
| I | 1.512 to 1.522 | 65.0 to 75.0 |
| II | 1.608 to 1.618 | 39.0 to 49.0 |
| III | 1.620 to 1.630 | 30.0 to 40.0 |
| IV | 1.512 to 1.522 | 65.0 to 75.0 |
| V | 1.608 to 1.618 | 39.0 to 49.0 |
| VI | 1.715 to 1.730 | 24.0 to 34.0 |
| VII | 1.400 to 1.900 | 20.0 to 70.0 |

A further specification of the optical parameters of the photographic objective 10 relates to the radii of the successive lens surfaces which are designated $R_1$ to $R_{14}$ numbering from the long conjugate side of the objective toward the image plane P, the values for said radii being given in the table of mathematical expressions herebelow, wherein the minus (—) sign means that the surface designated has its center of curvature located on the long conjugate side of the vertex of said surface, $$.283F < R_1 < .345F$$
$$.523F < -R_2 < .639F$$
$$.581F < -R_3 < .711F$$
$$.250F < R_4 < .306F$$
$$.318F < R_5 < .388F$$
$$.872F < R_6 < 1.066F$$
$$.349F < R_7 < .427F$$
$$.911F < -R_8 < 1.113F$$
$$.652F < -R_9 < .798F$$
$$5.82F < -R_{10} < 7.12F$$
$$.397F < -R_{11} < .485F$$
$$1.627F < R_{12} < 2.001F$$
$$R_{13} = \text{PLANO}$$
$$R_{14} = \text{PLANO}$$

Further, with respect to the specification of radii $R_1$ to $R_{12}$ related to the lens parts, it has been found advantageous to specify the ratios between the front and rear radii for each of the lenses I to VI as given in the table of mathematical statements herebelow in the form of absolute values of said ratios, $$.490 < \frac{R_1}{R_2} < .600$$
$$1.96 < \frac{R_3}{R_4} < 2.52$$
$$.229 < \frac{R_5}{R_6} < .401$$
$$.345 < \frac{R_7}{R_8} < .421$$
$$.101 < \frac{R_9}{R_{10}} < .123$$
$$.218 < \frac{R_{11}}{R_{12}} < .266$$

With respect to the aforementioned diaphragm D, all successful forms of this invention indicate that the axial distance from the rear vertex of lens II to said diaphragm should be substantially .01242F and the diameter thereof should be substantially .1354F which corresponds to a relative aperture setting of $f/7.2$ for said diaphragm.

One successful form of this invention is specifically stated in the table herebelow with respect to the radii $R_1$ to $R_{14}$, the lens spacings $S_1$ to $S_7$, the lens thicknesses $t_1$ to $t_7$, as well as the refractive index $n_D$ and Abbe number $\nu$, $$R_1 = .314F$$
$$-R_2 = .581F$$
$$-R_3 = .646F$$
$$R_4 = .278F$$
$$R_5 = .353F$$
$$R_6 = .969F$$
$$R_7 = .388F$$
$$-R_8 = 1.012F$$
$$-R_9 = .725F$$
$$-R_{10} = 6.47F$$
$$-R_{11} = .441F$$
$$R_{12} = 1.819F$$
$$R_{13} = \text{PLANO}$$
$$R_{14} = \text{PLANO}$$

| | |
|---|---|
| $S_1 = .002018F$ | $t_1 = .0192F$ |
| $S_2 = .0175F$ | $t_2 = .00639F$ |
| $S_3 = .774F$ | $t_3 = .01083F$ |
| $S_4 = .001328F$ | $t_4 = .00787F$ |
| $S_5 = .394F$ | $t_5 = .00492F$ |
| | $t_6 = .00492F$ |

$$S_6 + \frac{t_7}{n_7} + S_7 = .07394F$$

wherein the designations have the same meaning as explained earlier in the specification.

| Refractive Part | $n_D$ | $\nu$ |
|---|---|---|
| I | 1.5173 | 69.6 |
| II | 1.61328 | 43.9 |
| III | 1.6259 | 35.6 |
| IV | 1.5173 | 69.6 |
| V | 1.61328 | 43.9 |
| VI | 1.720 | 29.3 |
| VII | 1.523 | 58.6 |

Although only one specific form of the present invention has been shown and described in detail, it will be understood that modifications in form are possible and changes may be made in the optical constructional parameters of the objective within the limits specified heretofore without departing from the spirit of the invention as stated in the claims here appended.

We claim:

1. A long focus photographic objective having a relative aperture of substantially $f/7.2$, said objective comprising
    a front double convex lens I,
    a double concave lens II spaced rearwardly therefrom,
    a convex-concave lens III spaced rearwardly from lens II,
    a double convex lens IV and a concave-convex lens V spaced from lens III and from each other,
    a double concave lens VI and a plane parallel plate VII spaced rearwardly from lens V and from each other,
    the successive air spaces between and around said lenses and plate being designated $S_1$ to $S_7$, the successive refractive surfaces $R_1$ to $R_{14}$ thereof, as well as their individual successive axial thicknesses $t_1$ to $t_7$ having values substantially as stated in the table herebelow wherein the minus (—) sign used with the R values signifies those refractive surfaces which have their centers of curvature located on the long conjugate side of the vertices of the surfaces, $$R_1 = .314F$$
$$-R_2 = .581F$$
$$-R_3 = .646F$$
$$R_4 = .278F$$
$$R_5 = .353F$$
$$R_6 = .969F$$
$$R_7 = .388F$$
$$-R_8 = 1.012F$$
$$-R_9 = .725F$$
$$-R_{10} = 6.47F$$
$$-R_{11} = .441F$$
$$R_{12} = 1.819F$$
$$R_{13} = \text{PLANO}$$
$$R_{14} = \text{PLANO}$$

| | |
|---|---|
| $S_1 = .002018F$ | $t_1 = .0192F$ |
| $S_2 = .0175F$ | $t_2 = .00639F$ |
| $S_3 = .774F$ | $t_3 = .01083F$ |
| $S_4 = .001328F$ | $t_4 = .00787F$ |
| $S_5 = .394F$ | $t_5 = .00492F$ |
| $S_6 = .00492F$ | $t_6 = .00492F$ |
| $S_7 = .0675F$ | $t_7 = .00246F$ | where F represents the equivalent focus of said objective, the refracting lenses I to VI and plate VII being made of glass having a refractive index and Abbe number designated $n_D$ and $\nu$ respectively, the values of which are given in the chart herebelow,

| Refractive Part | $n_D$ | $\nu$ |
|---|---|---|
| I | 1.5173 | 69.6 |
| II | 1.61328 | 43.9 |
| III | 1.6259 | 35.6 |
| IV | 1.5173 | 69.6 |
| V | 1.61328 | 43.9 |
| VI | 1.720 | 29.3 |
| VII | 1.523 | 58.6 |

2. A long focus photographic objective having a relative aperture of substantially $f/7.2$ for use in a camera, said objective comprising
   a front double convex lens I,
   a double concave lens II spaced rearwardly therefrom,
   a convex-concavo lens III spaced rearwardly from lens II,
   a double convex lens IV and a concave-convex lens V spaced from lens III and from each other,
   a double concave lens VI and a plane parallel plate VII spaced rearwardly from lens V and from each other,
   the successive air spaces between and around said lenses and plate which are designated $S_1$ to $S_7$, the successive refractive surfaces $R_1$ to $R_{14}$ thereof, as well as their individual successive axial thicknesses $t_1$ to $t_7$ having values substantially as stated in the table herebelow wherein the minus (—) sign used with the R values signifies those refractive surfaces which have their centers of curvature located on the long conjugate side of the vertices of the surfaces, $R_1 = .314F$
$-R_2 = .581F$
$-R_3 = .646F$
$R_4 = .278F$
$R_5 = .353F$
$R_6 = .969F$
$R_7 = .388F$
$-R_8 = 1.012F$
$-R_9 = .725F$
$-R_{10} = 6.47F$
$-R_{11} = .441F$
$R_{12} = 1.819F$
$R_{13} = $ PLANO
$R_{14} = $ PLANO $S_1 = .002018F$    $t_1 = .0192F$
$S_2 = .0175F$      $t_2 = .00639F$
$S_3 = .774F$       $t_3 = .01083F$
$S_4 = .001328F$    $t_4 = .00787F$
$S_5 = .394F$       $t_5 = .00492F$
$S_6 = .00492F$     $t_6 = .00492F$
$S_7 = .0675F$      $t_7 = .00246F$ where F represents the equivalent focus of said objective, the refracting lenses I to VI and plate VII being made of glass having a refractive index and Abbe number designated $n_D$ and $\nu$ respectively, the values of which are given in the chart herebelow,

| Refractive Part | $n_D$ | $\nu$ |
|---|---|---|
| I | 1.5173 | 69.6 |
| II | 1.61328 | 43.9 |
| III | 1.6259 | 35.6 |
| IV | 1.5173 | 69.6 |
| V | 1.61328 | 43.9 |
| VI | 1.720 | 29.3 |
| VII | 1.523 | 58.6 | and a diaphragm located in the space between lenses II and III and an axial distance .01242F rearwardly of the vertex of surface $R_4$, the diameter of the diaphragm being substantially .1354F corresponding to a relative aperture of $f/7.2$.

No references cited.

JEWELL H. PEDERSEN, *Primary Examiner.*

R. J. STERN, *Assistant Examiner.*